(No Model.)
M. E. ROSENBAUM.
IMPLEMENT FOR HANGING OR TAKING DOWN PICTURE FRAMES.
No. 581,619. Patented Apr. 27, 1897.
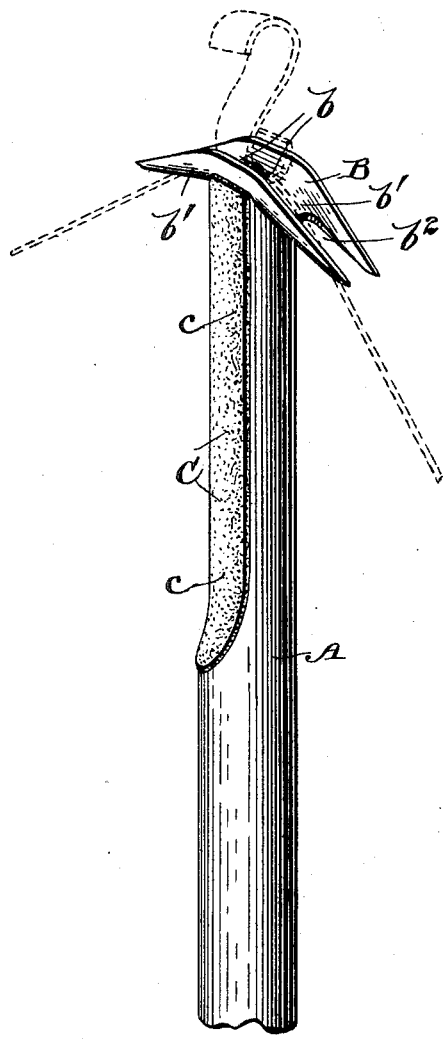
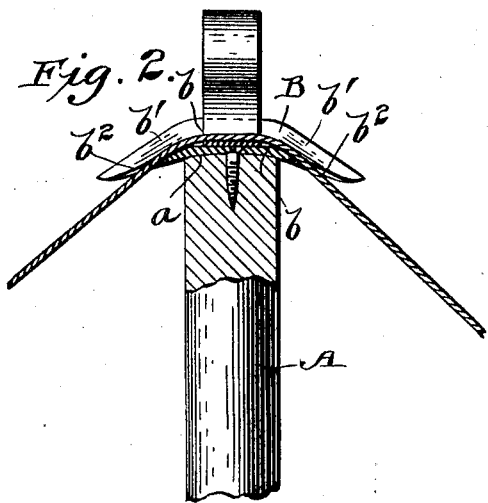
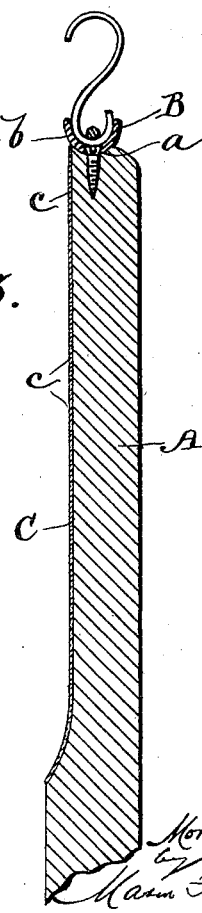
WITNESSES
INVENTOR
Morris E. Rosenbaum

UNITED STATES PATENT OFFICE.

MORRIS E. ROSENBAUM, OF NEW YORK, N. Y.

IMPLEMENT FOR HANGING OR TAKING DOWN PICTURE-FRAMES.

SPECIFICATION forming part of Letters Patent No. 581,619, dated April 27, 1897.

Application filed September 12, 1896. Serial No. 605,665. (No model.)

*To all whom it may concern:*

Be it known that I, MORRIS E. ROSENBAUM, a citizen of the United States, residing at New York city, in the county of New York and State of New York, have invented certain new and useful Improvements in Implements for Hanging or Taking Down Picture-Frames; and I do hereby declare the following to be a full, clear, and exact description of the invention, such as will enable others skilled in the art to which it appertains to make and use the same.

My invention relates to improvements in implements for hanging or taking down picture-frames; and it consists in certain novel constructions, combinations, and arrangements of parts, as will be hereinafter particularly described and claimed.

In the accompanying drawings, Figure 1 represents a perspective view of my improved implement for hanging picture-frames. Fig. 2 represents a vertical section of the same, and Fig. 3 represents a vertical section taken at right angles to Fig. 2.

A in the drawings represents a pole or staff, B a head-piece, and C a cut-away or flattened portion of said pole.

The pole A, preferably of wood, may be made of varying lengths, and is provided with a transverse notch $a$ in its upper end. The head-piece B is adapted to be secured in said notch $a$ by a screw or any other suitable means. This head-piece B, which is stamped or cast in one piece, is approximately segmental in contour, and is concaved upon its upper surface. The central portion of the concaved surface is horizontal for a distance about equal to two-thirds of the thickness of the pole, as at $b$. On either side of this horizontal portion $b$ the concave surface falls away at an angle to the said portion, as at $b'$ $b'$, forming laterally and oppositely extending supporting-arms. In each end of the head-piece deep notches $b^2$ $b^2$ are provided for the purpose hereinafter described.

One side of the pole or staff B is cut away or flattened, as at C, preferably, for about half the length of the pole, and the surface of this flattened portion is preferably covered with felt or some similar soft material, as $c$.

In using this implement for hanging a picture the flattened side of the pole is turned toward the face of the picture-frame, which will serve to steady the frame, while the felt $c$ upon said flattened surface will come in contact with the frame and prevent any liability of scratching or defacing the same.

My device is particularly well adapted for hanging pictures with the use of the ordinary suspension-hook, which is adapted to be hung upon a molding upon the wall. The lower end of the suspension-hook is placed in the central horizontal concave $b$ of the head-piece B, which offers by its shape a firm and secure support for the same, and the wire or cord is placed in the concave of the head-piece across the lower end of the suspension-hook and falls into the notches $b^2$ $b^2$ in each end of the head-piece. The picture and hook may then be raised and hung upon the molding, the tension of the wire holding the hook in the concave seat, and the notches $b^2$ $b^2$ preventing any possibility of the cord getting out of the concave of the head-piece B. When the weight of the picture has been transferred to the molding, the pole is free to be withdrawn. In taking a picture and hook down the pole is simply placed with its flat side next to the picture in such a manner that the concave head will come under the cord and hook, and the picture-frame and hook may then be lifted off the molding and lowered.

It will be noticed that by the shape of the head-piece B it is just as well adapted for handling large picture-frames having a wide span of cord as for handling small ones, and the central horizontal concave portion $b$ is wide enough to carry wide suspension-hooks as well as narrower ones.

While I have described this device more particularly in relation to handling frames hung on suspension-hooks, I wish it understood that I contemplate using it for frames suspended upon nails or otherwise, for it is of such a shape that it can be readily used in such instances by engaging the cord or wire to one side of said supporting means.

Having now described my invention, what I claim, and desire to secure by Letters Patent, is—

1. An implement for hanging and detaching picture-frames, comprising in its construction, a pole having at its upper end an approximately narrow elongated head, said head comprising a central concaved portion and laterally and oppositely extending supporting-arms, provided with notches in their ends, the notches being in line with the concave portion of the head, substantially as described.

2. An implement for hanging and detaching picture-frames, comprising in its construction, a pole provided with a notch at its upper end, an approximately narrow elongated head secured in said notch, said head comprising a central concaved horizontal portion to receive a suspension-hook, and laterally, oppositely and downwardly extending arms, provided with deep notches in their ends for receiving the picture-wire, the notches being in line with the concaved portion of the head, substantially as described.

3. An implement for hanging and detaching picture-frames, comprising in its construction, a pole provided with a flattened portion, which extends from its upper end downwardly a considerable distance, said flattened portion being covered with felt or the like, the pole also provided at its upper end with a head formed with a seat to receive the picture-hook, and with notches to receive the wire, substantially as described.

In testimony whereof I hereunto affix my signature in presence of two witnesses.

MORRIS E. ROSENBAUM.

Witnesses:
CHAS. H. LEHMANN,
EMIL A. BROMBACHER.